Patented Nov. 9, 1926.

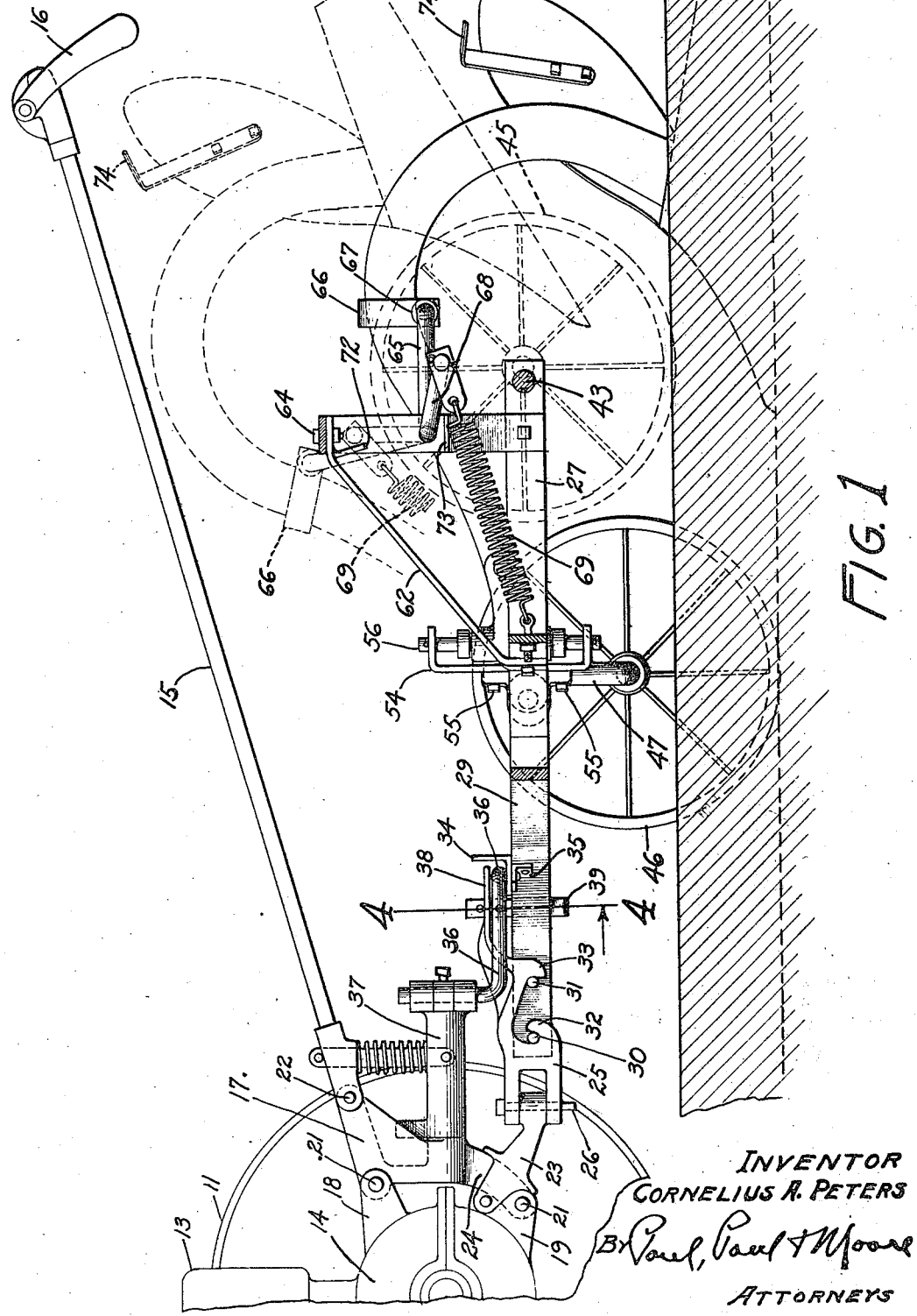

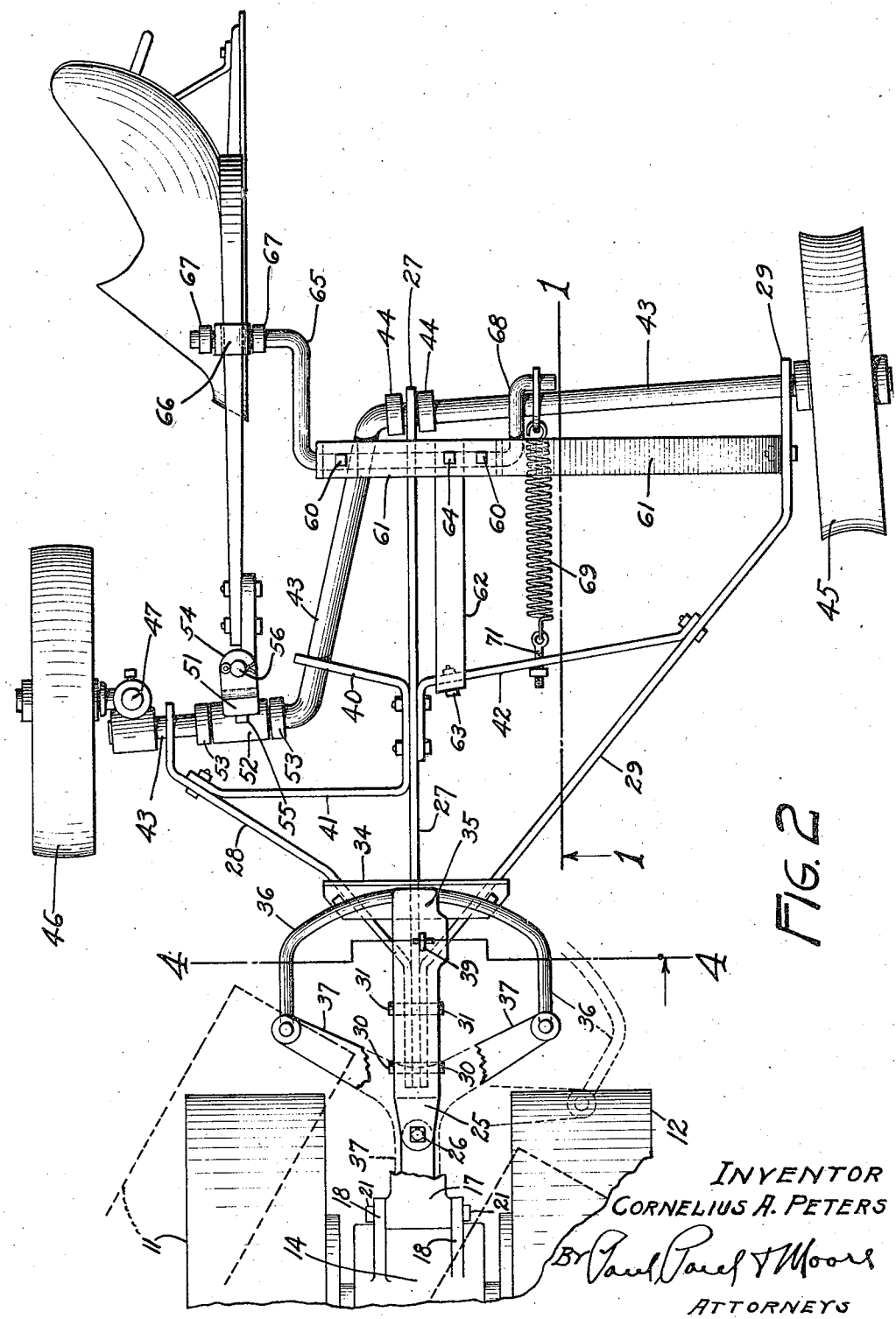

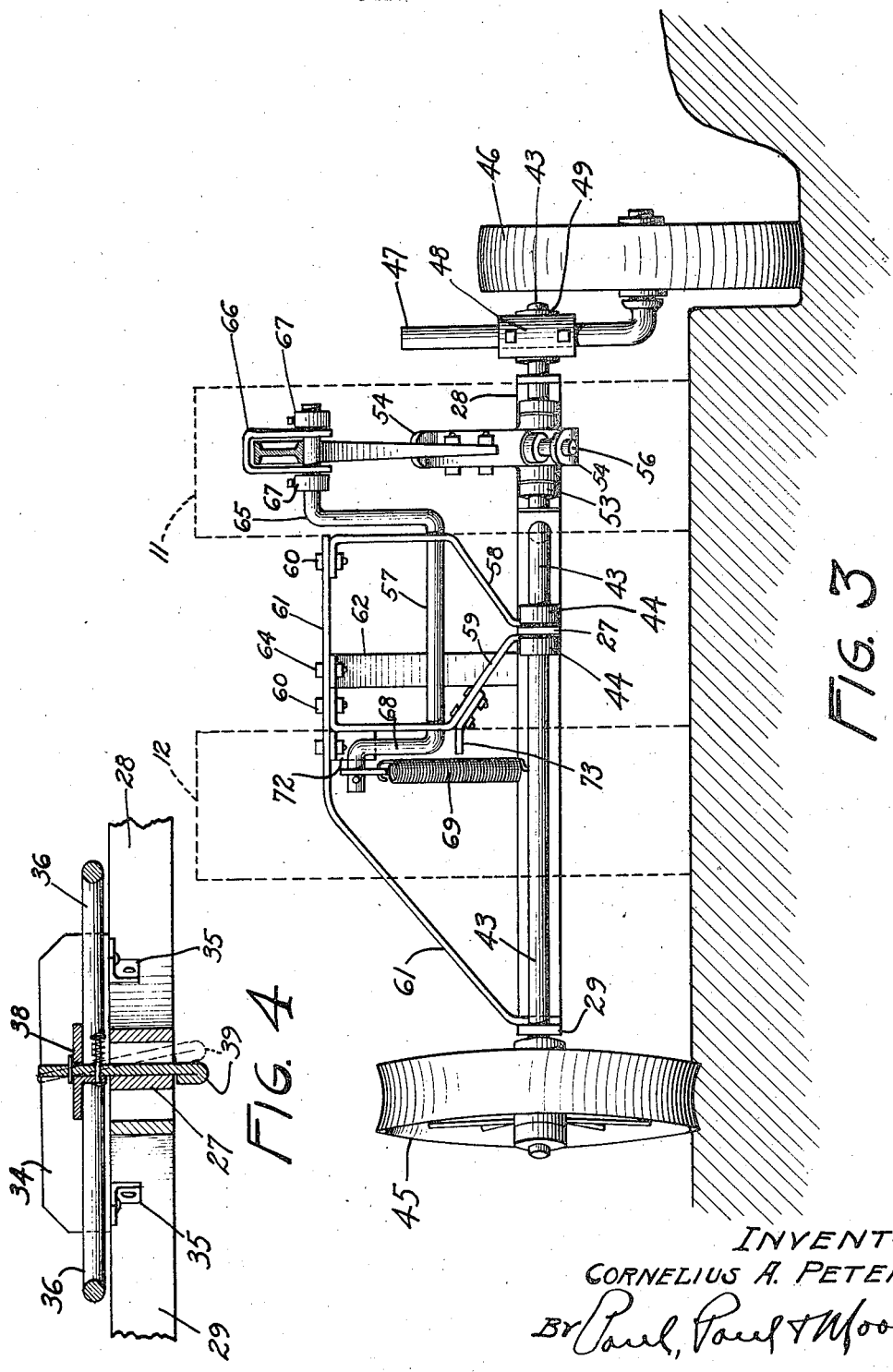

1,606,130

UNITED STATES PATENT OFFICE.

CORNELIUS A. PETERS, OF MINNEAPOLIS, MINNESOTA, ASSIGNOR, BY MESNE ASSIGNMENTS, TO THE NEW BEEMAN TRACTOR COMPANY, OF MINNEAPOLIS, MINNESOTA, A CORPORATION OF MINNESOTA.

DRAWBAR FRAME.

Application filed January 18, 1923. Serial No. 613,423.

This invention relates to drawbar frames such as are commonly used in connection with tractors generally, and particularly relates to drawbar frames to which plows or other ground-working implements may be attached for the purpose of tilling and working the soil.

Tractors of the two-wheeled type are usually provided with rearwardly extending handle bars by which the operator may steer and guide it when moving along the road or in the field. By means of the handle bars, the operator may also balance the tractor when disconnected from the drawbar frame or load. However, when the tractor is connected to, and hauling a load, means must be provided to positively prevent the tractor from tilting or buckling at the point where it is connected to the drawbar frame.

In the novel drawbar frame featured in this invention, means are provided whereby the tractor will be positively prevented from tilting or jackknifing when connected to the drawbar frame without the use of any loose bolts or pins. This frame is also mounted upon a pair of suitable carrying wheels, thus providing substantially a four-wheeled tractor when coupled to the tractor proper. The pivot or kingbolt connecting the tractor to the drawbar frame is also located at a point where it will practically eliminate all side thrust on the handle bars, usually prevalent in machines of this type.

Means are also provided whereby the plow or other ground-working implements may be raised or elevated from the ground and retained in an inoperative position without the use of the ordinary hand lever and quadrant.

The object of this invention, therefore, is to provide an improved drawbar frame.

Other objects of the invention will more fully appear from the following detailed description and the accompanying drawings and will be pointed out in the annexed claims.

In the drawings, there has been disclosed a structure designed to carry out the objects of the invention, but it is to be understood that the invention is not confined to the exact features shown, as various changes may be made within the scope of the claims which follow.

In the drawings:

Figure 1 is a vertical sectional view on the line 1—1 of Figure 2, showing the means provided for connecting the drawbar frame to the tractor and also indicating in full and dotted lines, the two positions of the plow;

Figure 2 is a plan view of Figure 1;

Figure 3 is a view in rear elevation showing the manner of supporting the plow upon the drawbar frame, and Figure 4 is a detail sectional view on the line 4—4 of Figure 2, showing the latch provided to securely lock the tractor to the drawbar frame.

In the selected embodiment of the invention here shown, there is illustrated a two-wheeled tractor of ordinary construction comprising the usual traction wheels 11 and 12, engine 13, crank case 14, and handle bars 15 provided with the usual hand-grips 16.

A bracket 17 is mounted upon the crank case 14 of the engine in any suitable manner, preferably by means of the rearwardly extending lugs 18 and 19 and the pins 21. The handle bars are pivotally mounted upon this bracket by means of the pins 22. A draw lug 23 is secured to the depending arm 24 of the bracket 17, and extends rearwardly to receive the forked end of a coupling bracket 25, pivoted thereto by a suitable kingbolt 26. This bracket is adapted to receive the forwardly extending terminal end of the drawbar frame, as indicated in Figures 1 and 2.

Referring to Figure 2, it will be noted that the main part of this frame consists of three metallic bars so interbraced with each other as to form a very substantial and rigid frame construction. The center bar 27 is preferably straight, while the two side bars 28 and 29 converge toward the forward end of the frame where their terminal ends are preferably arranged in parallel relation to the center bar 27. The two ends of the bars 28 and 29, and the end of the bar 27, are secured together by any suitable means such as by the bolts or pins 30 and 31. The ends of these pins preferably project beyond the outside face of the side bars 28 and 29 for the purpose of engaging the hooks 32 and 33 provided in the coupling bracket 25.

Means are also provided for positively preventing the tractor and drawbar frame from buckling at the point of hitch when hauling a load. A suitable angle bar 34 is provided at the forward end of the frame and has its ends secured to the side bars 28 and 29, preferably by means of the angle clips 35, riveted thereto. An arcuately formed supporting member 36 is adjustably mounted in the rear end of a Y-shaped bracket 37 which is borne by the bracket 17. This supporting member is adapted to rest upon the upper face of the horizontal flange of the angle bar 34. A rearwardly extending end portion 38 is provided upon the bracket 25 and is adapted to overhang the supporting member 36, and has mounted therein a suitable latch 39 adapted to engage the lower edge of the center bar 27 when the tractor and drawbar frame are coupled together.

Thus, when the tractor and frame are coupled together, as shown in Figure 1, it will be impossible for the coupling to buckle, as the supporting member 36 will be prevented from downward movement by the angle bar 34 and in like manner prevented from upward movement by the end portion 38 and latch 39 engaging the bottom of the bar 27. The supporting member 36, however, will be free to lateral movement, as indicated in Figure 2, when turning corners.

When it is desired to disconnect the tractor from the drawbar frame, it is only necessary to release the latch 39 from the bar 27 and tilt the tractor forwardly by means of the handle bars 15. When this is done, the supporting member 36 will be disengaged from the angle bar 34 and also the hooks 33 will be released from the pins 31. The operator will then impart a slight upward lift to the forward end of the frame, thereby disengaging the pins 31 from the hooks 32 and thus completely releasing the tractor from the drawbar frame.

As is shown in Figure 2, the side bars 28 and 29, and the center bar 27 are securely braced together by means of the braces 41 and 42. The rear terminal ends of the two side bars and the center bar, and also the end 40 of the brace bar 41, are preferably apertured to receive the irregularly shaped shaft 43, mounted therein. This shaft is restricted against lateral movement by means of the two collars 44, secured to the shaft.

A suitable carrying wheel 45, to run on the land, preferably having a concaved face or rim, is loosely mounted upon one end of this shaft, and is preferably arranged at a slight angle with reference to the centerline of the machine. Upon the opposite end of the shaft, a similar furrow wheel 46, having a convex face, is adjustably mounted by means of the angular rod or shaft 47 and the bearing 48. This bearing is provided with an integral hub 49 which is secured to the end of the shaft 43.

Means are also provided for adjustably connecting the plow or ground-working implement to the drawbar frame. A bracket 51 having a horizontal hub 52, loosely mounted upon the shaft 43, is provided between a pair of suitable collars 53 adjustably mounted upon the shaft. A forked draft bar 54 is secured to the bracket 51 by suitable bolts 55, and is apertured to receive a draft pin 56 to which the plow beam is connected, the forward end of the plow beam being capable of up and down adjustment upon this pin.

Means are also provided for retaining the plow in an inoperative position, as indicated by dotted lines in Figure 1, when it is desired to move the apparatus from one place to another.

A suitable crank rod or shaft 57 is preferably mounted in a pair of upright bars 58 and 59 having their lower ends secured to the center bar 27. A brace bar 61 is preferably secured to the upper ends of the upright bars 58 and 59 by bolts 60, and extends outwardly therefrom and has one end secured to the side bar 29. A similar brace bar 62 is interposed between the horizontal portion of the brace bar 61 and the cross bar 42, being secured thereto by suitable bolts 63 and 64. The crank rod 57 is provided at one end with a crank arm 65. The horizontal portion of this crank arm extends beneath the plow beam, as indicated in Figure 3, and has adjustably mounted thereon a U-shaped member or clevis 66 by means of the collars 67. The opposite end of the crank rod 57 is provided with a similar crank arm 68 adapted to support one end of a helical compensating spring 69. The other end of this spring is adjustably connected to the cross brace 42 by means of an eyebolt 71. Suitable stops 72 and 73 are also provided to limit the movement of the crank arms 65 and 68. It is also preferable to provide a hand-grip 74 upon the mould board of the plow by means of which the operator may raise and lower the plow.

When the plow is in its operative or working position, shown in full lines in Figure 1, the horizontal end portion of the crank arm 68 will be slightly below a horizontal centerline drawn longitudinally of the frame. When in the above position, the spring 69 will be under tension, thereby imparting a slight downward pressure upon the plow beam by means of the crank arm 65 and clevis 66.

When it is desired to raise or elevate the plow from the full to the dotted line position, shown in Figure 1, the operator will grasp the hand-grip 74 and raise the plow. As soon as the crank arm 68 gets to a point above its horizontal centerline, the compensating spring 69 will begin to contract, thereby counteracting the weight of the plow. The arm 68 will then engage the stop lug 72 and will be firmly held thereagainst by the spring, in which position the plow will be positively held in its inoperative or raised position. To lower the plow it is only necessary to grasp the hand-grip 74 and impart a downward pressure thereupon, or strike it with the foot. Thus, by the use of the above described mechanism, the usual hand lever and quadrant may be entirely dispensed with, thereby considerably simplifying the construction and reducing the cost of manufacture.

Another important feature of this invention resides in the relative location of the kingbolt 26 and the draft pin 56.

Referring to Figure 2, it will be noted that the kingbolt 26 is located midway between the two traction wheels 11 and 12 a short distance rearward of the axis of the driving wheels. It will also be noted that the draft pin 56 is located a considerable distance rearward of the kingbolt 26 and slightly to one side of the center-line of the drawbar frame.

The object of the above arrangement is to reduce to a minimum any side strain which may be transmitted to the handle bars due to the center of draft in the drawbar frame being offset from the centerline of the tractor, and also any strains which may be caused by turning corners, etc. Also by mounting the kingbolt as above described, the tractor will be much easier to guide and steer, and also the draft will be equally divided between the two traction wheels.

In various ways, the details of construction herein shown and described may be modified and still be within the scope of my invention.

I claim as my invention:

1. In combination with a traction machine frame having traction and supporting means, a coupling bracket mounted thereon, a draft frame having a coupling connection with said bracket, a latch for normally locking said bracket and draft frame against relative vertical movement, and means mounted to exert downward pressure on said draft frame and take up the reactive forces of said traction machine motor.

2. In combination with a traction machine frame having traction and supporting means, a coupling bracket mounted on said frame and provided with coupling jaws, a draft frame having laterally projecting pins to interlock with said jaws, a spring-actuated latch carried by said bracket to engage said draft frame and normally lock said frame and bracket against relative vertical movement, and means for resisting the downward thrust on said coupling bracket and frame resulting from the reactive forces of said traction machine motor.

3. In combination with a traction machine frame having traction and supporting means, a coupling bracket supported by said frame to pivot about a vertical axis, a draft frame having means for interlocking with said coupling bracket to prevent lateral movement of the frame relatively to said bracket, means for preventing relative vertical movement of said bracket and said frame, and a bail supported by said traction machine frame and having a bearing on said draft frame for transmitting thereto the downward thrust of said traction machine.

4. In combination with a traction machine, a draft coupling supported thereon, a draft frame having means for interlocking with said coupling, a spring-actuated latch device for normally locking said coupling and said frame together, and a bail supported by said traction machine and having a transverse sliding bearing on said draft frame for transmitting thereto the downward thrust of said traction machine.

5. In combination with a traction machine, a draft coupling, a draft frame having means for interlocking with said coupling, a spring-actuated latch carried by said coupling for engaging said draft frame and normally preventing relative vertical movement thereof, and a bail supported by said traction machine and having a transverse bearing on said draft frame, said coupling overhanging said bail and preventing its separation from said draft frame until said latch is released.

6. In combination with a traction machine having traction and supporting means, a coupling mounted on said machine, a draft frame having means for interlocking with said coupling, a member having rearwardly diverging arms supported by said traction machine above said coupling, a curved bail supported by said arms and having a transverse bearing on said draft frame to slide thereon, and means normally tending to hold said bail in contact with said frame and prevent relative vertical movement thereof, said bail normally transmitting to said frame the downward thrust of said traction machine.

In witness whereof, I have hereunto set my hand this 10th day of January 1923.

CORNELIUS A. PETERS.